(12) United States Patent
Russell et al.

(10) Patent No.: US 8,792,945 B2
(45) Date of Patent: Jul. 29, 2014

(54) METHODS AND DEVICES FOR DUAL MODE BIDIRECTIONAL AUDIO COMMUNICATION

(75) Inventors: Michael E. Russell, Lake Zurich, IL (US); Mark R. Braun, Arlington Heights, IL (US); Arnold Sheynman, Northbrook, IL (US); Tongyan (Annie) Zhai, Pleasant Prairie, WI (US)

(73) Assignee: Motorola Mobility LLC, Chicago, IL (US)

( * ) Notice: Subject to any disclaimer, the term of this patent is extended or adjusted under 35 U.S.C. 154(b) by 1338 days.

(21) Appl. No.: 11/842,259

(22) Filed: Aug. 21, 2007

(65) Prior Publication Data

US 2008/0101279 A1 May 1, 2008

Related U.S. Application Data

(60) Provisional application No. 60/863,588, filed on Oct. 31, 2006.

(51) Int. Cl.
*H04M 1/00* (2006.01)

(52) U.S. Cl.
USPC .................. 455/569.1; 455/552.1; 370/328; 370/338

(58) Field of Classification Search
USPC .................. 370/328, 338; 455/552.1, 569.1
See application file for complete search history.

(56) References Cited

U.S. PATENT DOCUMENTS

| | | | |
|---|---|---|---|
| 5,986,589 A | 11/1999 | Rosefield et al. |
| 6,928,266 B1 | 8/2005 | Nevo et al. |
| 7,039,358 B1 | 5/2006 | Shellhammer et al. |
| 7,046,649 B2 | 5/2006 | Awater et al. |
| 7,133,398 B2 | 11/2006 | Allen et al. |
| 7,373,172 B2 | 5/2008 | Godfrey |

(Continued)

FOREIGN PATENT DOCUMENTS

| | | |
|---|---|---|
| EP | 1089502 A2 | 9/2000 |
| EP | 1089502 B1 | 9/2000 |

(Continued)

OTHER PUBLICATIONS

Bluetooth SIG: "Bluetooth Core System Package [Controller Volume], Part B, Baseband Specification, Version 1.2", Nov. 5, 2003, vol. 2, pp. 45-188.

(Continued)

*Primary Examiner* — Lester Kincaid
*Assistant Examiner* — Dung Lam
(74) *Attorney, Agent, or Firm* — Gary J. Cunningham (57) ABSTRACT

Disclosed are dual mode I/O devices and methods for transmission of a short range radio link such as a Bluetooth® link that is a bi-directional real-time audio communication signal that can be over a synchronous circuit-switched transport and an asynchronous packet-switched transport either sequentially or simultaneously. Also disclosed are dual mode wireless headset systems and methods of at least two dual mode I/O devices and more particularly including a wireless audio terminal and an audio gateway for transmission of a bi-directional real-time audio communication signal that can be over a synchronous circuit-switched (SCO) transport and an asynchronous packet-switched (ACL) transport either sequentially or simultaneously. Having both SCO and ACL modes available may allow the user to optimize voice quality or data throughput under different operating conditions. The user may benefit from better Bluetooth®voice quality and may have the flexibility of using either mode depending upon the situation.

28 Claims, 7 Drawing Sheets

(56) References Cited

U.S. PATENT DOCUMENTS

| | | | |
|---|---|---|---|
| 7,480,490 | B2 | 1/2009 | Haartsen |
| 7,545,787 | B2 | 6/2009 | Bitran et al. |
| 2001/0005367 | A1 | 6/2001 | Liu et al. |
| 2002/0004397 | A1 | 1/2002 | Lee et al. |
| 2002/0071477 | A1 | 6/2002 | Orava |
| 2002/0136233 | A1 | 9/2002 | Chen et al. |
| 2003/0169697 | A1 | 9/2003 | Suzuki et al. |
| 2004/0048572 | A1 | 3/2004 | Godfrey |
| 2004/0062269 | A1 | 4/2004 | Western |
| 2004/0202128 | A1 | 10/2004 | Hovmark et al. |
| 2005/0025174 | A1 | 2/2005 | Fischer et al. |
| 2005/0041694 | A1 | 2/2005 | Liu |
| 2005/0059347 | A1 | 3/2005 | Haartsen |
| 2005/0147071 | A1 | 7/2005 | Kraoguz et al. |
| 2005/0181823 | A1 | 8/2005 | Haartsen |
| 2005/0215197 | A1 | 9/2005 | Chen et al. |
| 2005/0271010 | A1 | 12/2005 | Capretta |
| 2005/0286476 | A1 | 12/2005 | Crosswy et al. |
| 2006/0030327 | A1 | 2/2006 | Lee et al. |
| 2006/0056332 | A1* | 3/2006 | Arase et al. ............... 370/328 |
| 2006/0056383 | A1 | 3/2006 | Black et al. |
| 2006/0120329 | A1 | 6/2006 | Kim et al. |
| 2006/0194538 | A1 | 8/2006 | Palin et al. |
| 2006/0205363 | A1 | 9/2006 | Godfrey |
| 2007/0010250 | A1 | 1/2007 | Bosch et al. |
| 2007/0014259 | A1 | 1/2007 | Fajardo et al. |
| 2007/0110015 | A1 | 5/2007 | Chakraborty et al. |
| 2007/0143105 | A1* | 6/2007 | Braho et al. ............... 704/231 |
| 2008/0056193 | A1 | 3/2008 | Bourlas et al. |
| 2008/0113692 | A1 | 5/2008 | Zhao et al. |
| 2008/0130676 | A1 | 6/2008 | Liu et al. |
| 2008/0139212 | A1 | 6/2008 | Chen et al. |
| 2008/0144645 | A1 | 6/2008 | Russell et al. |
| 2008/0205365 | A1 | 8/2008 | Russell et al. |
| 2010/0172271 | A1* | 7/2010 | Guccione ............... 370/260 |

FOREIGN PATENT DOCUMENTS

| | | |
|---|---|---|
| GB | 2373412 A | 9/2002 |
| WO | 2004034722 A2 | 4/2004 |
| WO | 2004045092 A1 | 5/2004 |
| WO | 2005020518 A1 | 3/2005 |
| WO | 2006090242 A1 | 8/2006 |

OTHER PUBLICATIONS

Kapoor R et al: "Bluetooth: carrying voice over ACL links" Mobile and Wireless Communications Network, 2002. 4th International Workshop on Sep. 9-11, 2002, Piscataway, NJ USA, whole document.

Patent Cooperation Treaty, "PCT Search Report and Written Opinion of the International Searching Authority" for International Application No. PCT/US2007/082960 dated Aug. 6, 2008, 15 pages.

United States Patent and Trademark Office, "Non-Final Rejection" for U.S. Appl. No. 11/842,275 dated Oct. 5, 2009, 14 pages.

United States Patent and Trademark Office, "Final Rejection" for U.S. Appl. No. 11/842,275 dated Nov. 24, 2010, 20 pages.

Patent Cooperation Treaty, "PCT Search Report and Written Opinion of the International Searching Authority" for International Application No. PCT/US2007/086644 dated Jun. 26, 2008, 18 pages.

Chiasserini C. F. et al, "Coexistence Mechanisms for Interference Mitigation Between IEEE 802.22 WLANs and Bluetooth", The Conference on Comupter Communications 21st Annual Joint Conference of the IEEE Computer and Communications Societies, Jun. 23-27, 2002, 9 pages.

United States Patent and Trademark Office, "Non-Final Rejection" for U.S. Appl. No. 11/567,744 dated Apr. 15, 2009, 15 pages.

United States Patent and Trademark Office, "Non-Final Rejection" for U.S. Appl. No. 11/567,744 dated Dec. 28, 2009, 17 pages.

IEEE Std 802.15.2™-2003, Local and metropolitian area networks—Part 15.2.

BTV_2Sec6_5_1_3.pdf, from the Specification of the Bluetooth System, Core Specification V1.2 (2003)—Downloadable from—http://download.www.techstreet.com/cgi-bin/pdf/free/298250/BT_Core_v1_2.pdf and at Bluetooth.org.

Patent Cooperation Treaty, "PCT Search Report and Written Opinion of the International Searching Authority" for International Application No. PCT/US2007/081080 dated Apr. 8, 2008, 16 pages.

Palin A et a;: "VoIP Call Over WLAN With Bluetooth Headset—Multiradio Interoperability Solutions" Personal, Indoor and Mobile Radio Communications, 2005. IEEE 16th International Symposium on Berlin, Germany Sep. 11-14, 2005, pp. 1560-1564.

IEEE Standard for Local and Metropolitian Area Networks: Part 16: Air Interface for Fixed and Mobile Broadband Wireless Access Systems; IEEE STD 802.16E-2005, Feb. 28, 2006, pp. 228-231, XP002473897.

Ophir L et a;: "Wi-Fi (IEEE 802.11) and Bluetooth Coexistence; Issues and Solutions"—Personal, Indoor and Mobile Radio Communications, 2004. PIMRC 2004. 15th IEEE International Symposium on Barcelona, Spain Sep. 5-8, 2004, Piscataway, NJ, USA, IEEE, vol. 2, Sep. 5, 2004, pp. 847-852.

United States Patent and Trademark Office, "Non-Final Rejection" for U.S. Appl. No. 11/674,433 dated Aug. 6, 2009, 14 pages.

United States Patent and Trademark Office, "Final Rejection" for U.S. Appl. No. 11/674,433 dated Apr. 4, 2010, 17 pages.

IEEE Std 802.16e-2005; IEEE Std 802.16-2004/Cor 1-2005; Amendment 2 and Corrigendum 1 to IEEE STD 802.16-2004; pp. 232-233.

\* cited by examiner

METHODS AND DEVICES FOR DUAL MODE BIDIRECTIONAL AUDIO COMMUNICATION

FIELD

Disclosed are wireless headsets and methods of wireless headsets, and more particularly dual mode wireless headsets and methods for use with an audio gateway device.

BACKGROUND

Bluetooth® wireless technology provides a manner in which many wireless devices may communicate with one another, without connectors, wires or cables. Bluetooth® technology uses the free and globally available unlicensed 2.4 GHz ISM spectrum, for low-power use, allowing two Bluetooth® devices within a range of up to 10 to 100 meters to share data with throughput up to 2.1 Mbps. Each Bluetooth® device can simultaneously communicate with multiple other devices.

Current common uses for Bluetooth® technology include those for headsets, cellular car kits and adapters. Moreover, Bluetooth® technology is currently used for connecting a printer, keyboard, or mouse to a personal computer without cables. Since Bluetooth® technology can facilitate delivery of large amounts of data, computers may use Bluetooth® for connection to the Internet through a mobile phone. Bluetooth® devices can connect to form a piconet, which consists of a master and up to seven slave devices. Two types of connections can be established in a piconet: a Synchronous Connection Oriented (SCO) link, and an Asynchronous Connectionless (ACL) link. SCO links provide a circuit-oriented service with constant bandwidth based on a fixed and periodic allocation of time slots that is used for voice transmission. There are also extended synchronous connection-oriented packets (eSCO) that have the same functionality as SCO packets but allow for more packet types, data types, and limited retransmissions. ACL connections, on the other hand, provide a packet-oriented service that is used for transmission of data and control signals. Traditionally, voice communication on SCO is bi-directionally processed by a voice codec or encoder/decoder while stereo communication on ACL is uni-directionally processed by a stereo codec. In a communication device, there are two separate codecs, one for communicating audio on SCO and the other for communicating audio on ACL.

Wireless Local Area Networks (WLANs) are becoming compatible with many different types of products. While businesses originally installed WLANs so that desktop computers could be used on networks without expensive wiring, the functionality of the WLANs has evolved to allow mobile communication devices, such as wireless telephones, laptop computers, personal digital assistants (PDAs) and digital cameras to connect to WLANs for Internet access and wireless Voice over Internet Protocol (VoIP) telephone service. Short for wireless fidelity, WiFi® is a trademark for sets of product compatibility standards for WLANs. Manufacturers of mobile communication devices such as cellular telephones are WiFi® enabling the devices so that when a user roams into a WiFi® hot spot, a telephone can switch its communication protocol from the cellular band that uses licensed, limited spectrum to WiFi® communication protocol that uses available unlicensed spectrum. In indoor situations, a switch to a WiFi® protocol from a cellular network such as one based on the Global System for Mobile Communication standard (GSM) may be additionally beneficial since a cellular network can lose its signal strength indoors while a WLAN may have a strong signal within a hotspot.

The Bluetooth® 2.4 GHz radio band is close to that of particular transceivers that operate at 2.3 GHz or 2.5 GHz, such as the Worldwide Interoperability for Microwave Access (WiMAX™) Worldwide Interoperability for Microwave Access (WiMAX™) transceiver based on IEEE 802.16e. Communication of audio signals between Bluetooth® devices may collide in time with other signals such as WiFi® and other standards-based wireless technologies such as Worldwide Interoperability for Microwave Access (WiMAX™), thus desensitizing the receivers due to insufficient blocking performance and overlapping spectrum allocations. There can be adjacent channel interference with WiFi® for example and with WiMAX™, as the Bluetooth® guard band is only 20 MHz. Synchronous connections, in particular SCO, such as those used in headsets are inflexible in scheduling of transmission and reception and result in simultaneous use of both radios, especially in an "802.16e" transceiver on a mobile device having packets scheduled by the WiMAX™ basestation, causing interference problems. While synchronous connections using eSCO have a limited ability to schedule packet transmissions, due to the limited retransmission window, they will still have periodic collisions with other wireless technologies and use more bandwidth and system resources than SCO links. The Bluetooth® Core Specification describes a solution for co-existence with WiFi® that mitigates interference. Advanced Frequency Hopping (AFH) is one technique that shrinks the available bandwidth to prevent using the same portion of the ISM band as another technology. Though this does not solve the problem of adjacent channel interference from other technologies such as WiMAX™ with high transmit powers and poor adjacent channel rejection. When Bluetooth® and WiFi® or WiMAX™ are collocated, AFH can be insufficient and a collaborative method of co-existence such as Packet Traffic Arbitration (PTA) may be used. However, PTA can significantly impact the WiFi® data rate when Bluetooth® SCO or eSCO is active.

Bluetooth® devices, and particularly headsets, enjoy popularity because they can offer users the ability to communicate while seamlessly operating in different environments. Accordingly, providing improved voice quality over Bluetooth® has become important for mobile device manufacturers. It would be beneficial were improvements made to voice quality over Bluetooth®.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Disclosed are dual mode I/O devices and methods for transmission of a short range radio link such as a Bluetooth® link that is a bi-directional real-time audio communication signal that can be over a synchronous circuit-switched transport and an asynchronous packet-switched transport either sequentially or simultaneously. Also disclosed are dual mode wireless headset systems and methods of at least two dual mode I/O devices and more particularly including a wireless audio terminal and an audio gateway for transmission of a bi-directional real-time audio communication signal that can be over a synchronous circuit-switched (SCO) transport and an asynchronous packet-switched (ACL) transport either sequentially or simultaneously. As mentioned above, a synchronous circuit switched transport can be used for voice data transmission. As will be described in detail below, an asynchronous packet-switched transport that is according to the Bluetooth® specification used for data and control signal transmission can be used for audio and in particular voice communication transmission. Dual mode refers to use of both an SCO mode and an ACL mode for voice communication. Either one or both of the wireless audio terminal and the audio gateway can process signals of both an SCO transport and an ACL transport. To process both transports, SCO and ACL, a single encoder/decoder in either or both devices can provide bi-directional audio communication from a single source.

Transport selection can be based on both transports' advantages and disadvantages when transferring audio, and in particular voice data. Transport selection for audio, and in particular voice transmission is characterized differently than for example, changing applications such as voice audio on SCO and streaming stereo on ACL where a choice is made between mutually exclusive telephony and single-directional media playing. Transport selection for voice transmission is further characterized differently from traditional methods of mitigating Bluetooth® interference. It is understood that voice communication is an example of a bi-directional audio communication.

In contrast to the limited scheduling ability of SCO and limited retransmissions of eSCO packets and their implementation in headsets and handsfree devices, a voice over ACL system with a scheduling process may avoid simultaneous transmissions and receptions with other time division multiplexing (TDM) technologies by varying when packets are sent versus the fixed frequency transmissions of SCO and eSCO links. Having both SCO/eSCO and ACL modes available may allow the user to optimize voice quality or data throughput under different operating conditions. From this point on the term SCO or SCO mode will include the functionalities of eSCO. In some noisy RF environments, voice over ACL may result in better audio quality than SCO. In either case, the user may benefit from better Bluetooth® voice quality and may have the flexibility of using either mode (SCO or ACL) depending upon the situation. In particular, switching between SCO and ACL can be based on certain criteria such as quality of signal indicators or network infrastructure, for example, when handing over from a GSM cell to a WiFi® access point or WiMAX™ basestation.

In the above-mentioned devices, systems and methods, transport selection of one of the SCO and ACL transports for real-time audio signal communication may be based upon operating conditions or manual activation. Transport selection according to operating conditions may be based on, for example, radio frequency quality measurements and network criteria as mentioned above and power management criteria. A Bluetooth® audio I/O device can be, for example, a headset, a carkit, a handset of a cordless telephone, and a handset of a mobile communication device. An audio gateway may be, for example, a mobile telephone, a computer, a Bluetooth® headset, and a Bluetooth® handsfree carkit.

During transmission and receipt of audio signals, and in particular voice signals, a Bluetooth® device can switch between a synchronous circuit-switched transport and an asynchronous packet-switched transport. Each transport has particular characteristics and benefits, and the two transports are mutually exclusive, except for example during the switching process where they may be simultaneously transmitted as discussed in detail below. The ability to use two transports for bi-directional audio signals, and in particular voice signals can improve voice quality over Bluetooth®, enhancing the user's experience of seamless mobility. In a system such as a Bluetooth® headset and a Bluetooth® enabled handset, one or the other device can make a transport selection of one of the transports for real-time audio signal communication based upon operating conditions and/or manual activation.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
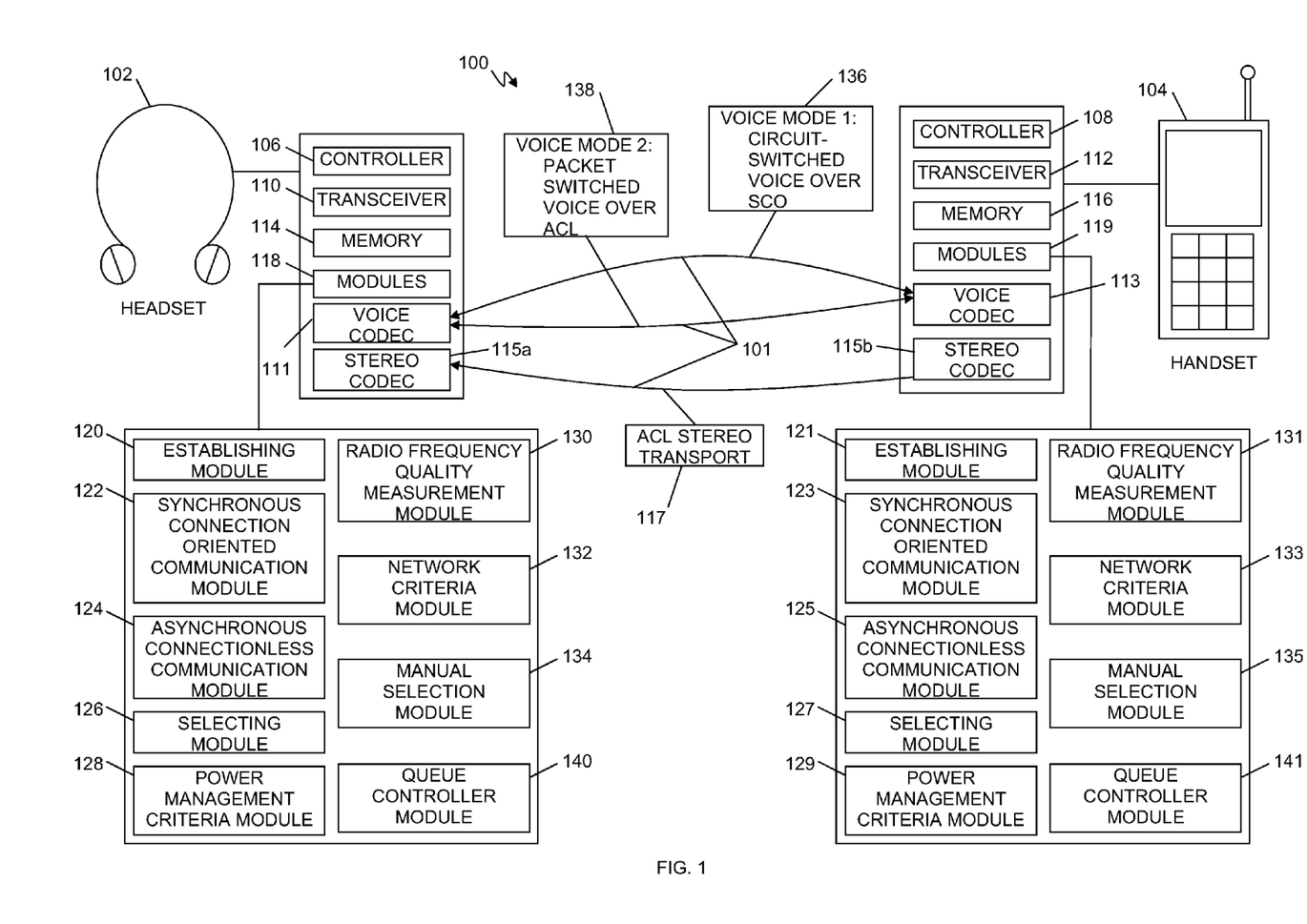
FIG. 1 illustrates a system of two Input/Output (I/O) devices configured to transmit and/or receive via a short range radio link.

FIG. 1 illustrates a system 100 of two I/O devices 102 and 104 configured to transmit and/or receive via a short range radio link. The short range radio link can be a Bluetooth® link that is a bi-directional real-time audio communication signal, and can be sent over a synchronous circuit-switched transport and an asynchronous packet-switched transport either sequentially or simultaneously. The system 100 can include more than two devices. The first device 102 is depicted as a wireless audio terminal, such as a Bluetooth® headset, Bluetooth® handsfree carkit, a mobile phone or a Bluetooth® adapter with attached stereo speakers. The second device 104 is depicted as an audio gateway such as a mobile communication device, a computer, a Bluetooth® headset or a Bluetooth® handsfree carkit. A second device 104 may be complimentary to the first device 102 so far as the functions and some, most or all of the Bluetooth® architecture. However, the functions and/or architecture may be unique to each device as well.

The mobile communication device 104 may be implemented as a cellular telephone (also called a mobile phone). The mobile communication device 104 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The devices 102 and 104 are depicted as each having a controller 106 and 108 respectively. They also can include one or more transceivers 110 and 112. Each device 102 and 104 may further include a voice codec that can also be referred to as an encoder/decoder 111 and 113 respectively. The terms encoder, encoder/decoder, analog-to-digital (A/D) and digital-to-analog (D/A) converter, and codec may be used interchangeably. Moreover, they can include memory 114 and 116 which may store instruction modules 118 and 119.

The modules 118 of device 102 and 119 of device 104 can carry out certain processes of the methods as described herein. Steps of methods may involve modules and modules may be inferred and/or implied by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

Establishing modules 120 and 121 are for receiving real-time audio signals from a single source. SCO communication modules 122 and 123 are for bi-directionally communicating with another I/O device, via a short range radio link, real-time audio signals over a synchronous circuit-switched transport. ACL communication modules 124 and 125 are for bi-directionally communicating with another I/O device, via a short range radio link, real-time audio signals over an asynchronous packet-switched transport. Selecting modules 126 and 127 are for selecting one of the transports for real-time audio signal communication based upon operating conditions. Power management criteria modules 128 and 129 are for transport selection. Radio frequency quality measurement modules 130 and 131 are for transport selection. Network criteria modules 132 and 133 are for transport selection. Manual selection modules 134 and 135 are for manually activating one or the other of the above described transports. Queue controller modules 140 and 141 are for managing packets in an encoder or decoder queue.

Referring to device 102 FIG. 1 further illustrates that the transceiver 110 is coupled to the controller 106 and that the transceiver 110 can be configured to establish a short range radio link and bi-directionally communicate real-time audio signals 101 over a synchronous circuit-switched (SCO) transport 136 and an asynchronous packet-switched transport (ACL) 138 over the short range radio link in accordance with establishing module 120 for receiving real-time audio signals from a single source. That is, for example, in bi-directional communication between the headset 102 having a single source voice codec 111 and the handset 104 having a single source voice codec 113, the transmission of the SCO transport 136 and the ACL transport 138 can be both processed from a single source, codec 111 and codec 113 of each device 102 and 104, respectively. Either or both devices 102 and/or 104 may include a bi-directional voice codec 111 and/or 113, respectively.

For the purpose of illustration, devices 102 and 104 are equipped with stereo codecs 115a and 115b respectively to further describe a single source and distinguish between the bi-directional ACL voice communication 138 and unidirectional ACL stereo communication 117. A traditional mono voice system with stereo music capability use both a bi-directional SCO communication mode 136 utilizing voice codecs 111 and 113 and an unidirectional ACL communication mode 117 utilizing stereo codecs 115a and 115b. In this example the source of audio from device 104 is seen to be from two sources, 113 and 115b, and in contrast to the disclosed methods and systems are mutually exclusive and the audio communication over the ACL transport is not bi-directional. While FIG. 1 shows two ACL paths 117 and 138 for illustrative purposes, there is only one ACL transport between devices 102 and 104. Accordingly, a described headset 102, for example, can be backwards compatible with an existing handset 104 using the SCO transport if the handset 104 is not capable of using the ACL transport 138 for voice communication and vice-versa. A handset 104 with a single source voice codec 113 as described may operate better with a headset 102 with a single source voice codec 111 according to this disclosure.

A hardware and/or software switch for transport selection of one of the transports for real-time audio signal communication based upon operating conditions is discussed in detail below. The system 100 of two devices 102 and 104 can communicate bi-directionally over the short range radio link 101 over a synchronous circuit-switched transport 136 and an asynchronous packet-switched transport 138 either sequentially or simultaneously.

Figure 2:
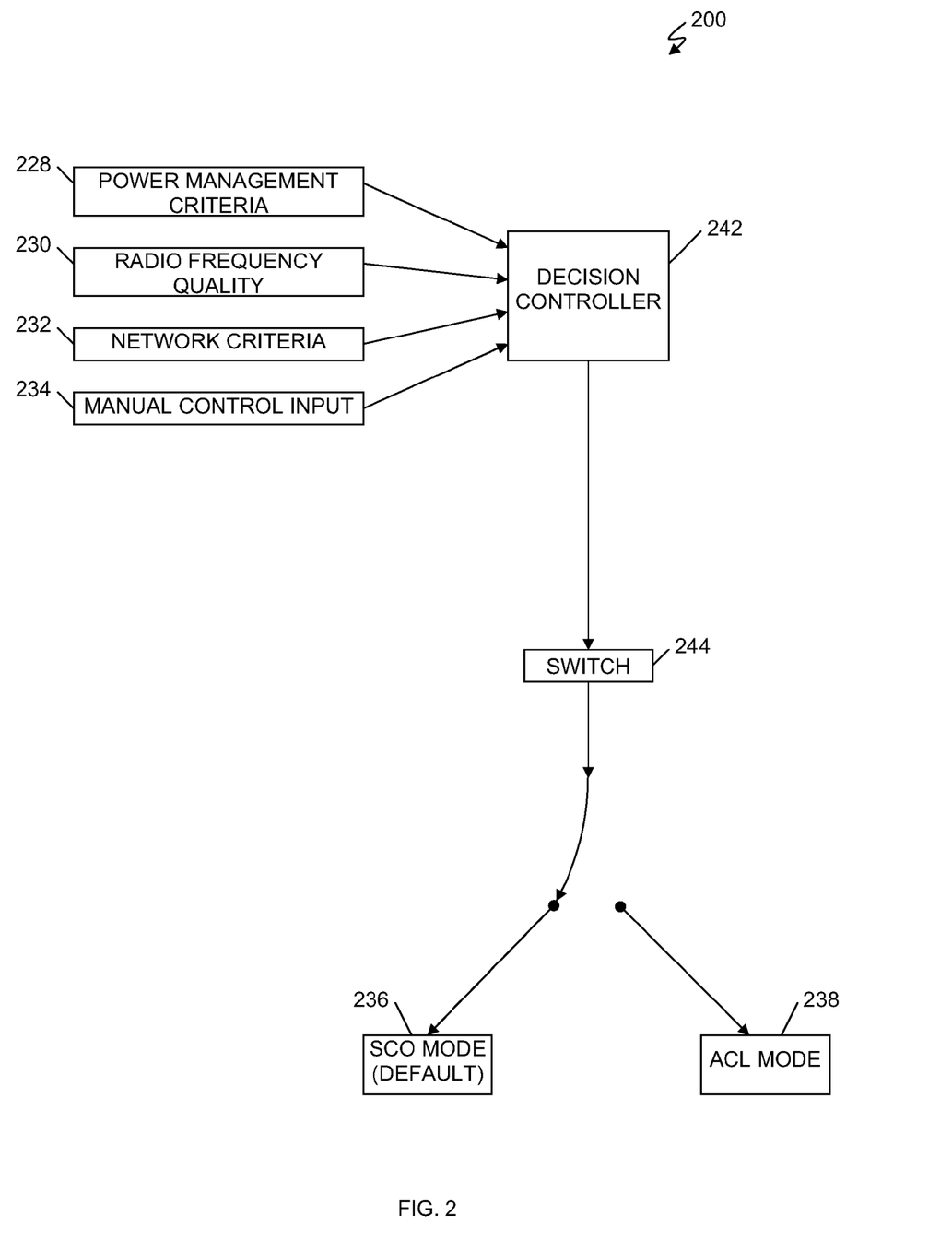
FIG. 2 is a flowchart illustrating input to a decision controller and output to switch between one and another transport.

FIG. 2 is a flowchart 200 illustrating input to a decision controller 242 and output to switch between one and the other above-described transports. A selection module 126 of device 102 (see FIG. 1) may provide instructions to the decision controller 242 that can receive automatic or manual activation. Automatic transport selection can be based, for example, on at least one of power management criteria 228, radio frequency quality measurements 230 and network criteria 232. Manual transport selection 234 may be provided by a user during regular operation, either through a button press or through a user interface on, for example, a mobile communication device 104 (see FIG. 1) or another Bluetooth® enabled wireless device to which a dual mode Bluetooth® headset 102 is paired. A manual transport selection user interface may be coupled to the headset 102 as well. For example, if a user were to notice degradation over the voice link, the user could change modes using the headset man-machine interface to try to take advantage of the performance of the other link mode. Accordingly, a hardware and/or software switch 244 for transport selection of one of the transports for real-time audio signal communication may be manually activated and/or automatically activated and based upon operating conditions.

Automatic transport selection can be based on one or more of different criteria including power management criteria 228, radio frequency quality measurements 230 and network criteria 232. It is understood that any automatic transport selection criteria is within the scope of this discussion. If more than one criterion is considered, weighting of criteria or other criteria characterization may provide a determination of which criterion or criteria is controlling. Moreover, additional criteria or fewer criteria than those mentioned may be considered as well.

The automatic transport selection according to power management criteria 228 can include that the components of the device reach or exceed threshold values for a battery meter indicator or current drain measurement. The automatic transport selection according to radio frequency quality measurements 230 can include that the radio frequency quality is based on a Signal-to-Noise measurement, a channel map classification based upon number of channels with measured interference, a link quality measurement, a lost packets threshold, a missed packets threshold, a header errors threshold or a packet error rate threshold. The automatic transport selection according to network criteria 232 can include that the network criteria is based on a wide area network indicator, a packet scheduling requirement for co-existence between wide area network and short range radio network, a system latency requirement, a system jitter requirement or a system bandwidth requirement for data rate. The decision controller 242 may then operate according to instructions of the selecting module 126 and one or more of the power management criteria module 128, the radio frequency management module 130, the network criteria module 132 and/or the manual selection module 134 to activate the SCO mode 236 and/or the ACL mode 238, sequentially or simultaneously.

Figure 3:
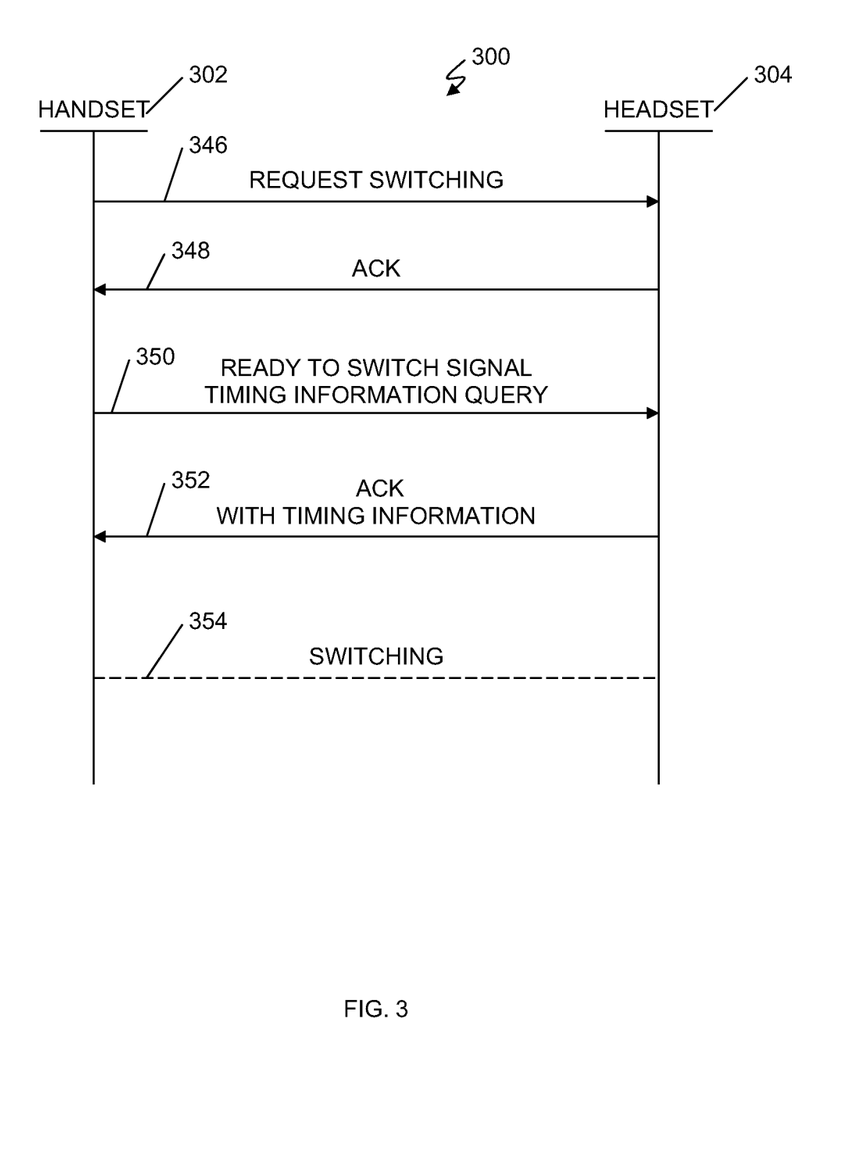
FIG. 3 is a signal flow diagram for two devices, in this example a headset and a handset when the handset is the initiator.

FIG. 3 is a signal flow diagram 300 for two devices, in this example a handset 302 and a headset 304 when the handset 302 is the initiator. When the headset 304 is the initiator, the signaling diagram can be illustrated in the similar manner by exchanging the role of handset 302 and headset 304. The signal flow diagram illustrates messages that may be exchanged between the handset 302 and the headset 304 to enable the switching synchronization between the handset 302 and the headset 304.

The handset 302 may transmit a request switching signal 346 to the headset 304. The headset 304 may transmit an acknowledgement (ACK) signal 348 in response. The handset 302 may transmit a ready to switch with timing information query 350. The timing information may be exchanged to enable the synchronization between the handset 302 and the headset 304. The headset 304 may transmit an ACK signal 352 with any timing information in response. The switching may then occur 354 between the two devices so that the devices 302 and 304 may bi-directionally communicate real-time audio signals over a synchronous circuit-switched transport and an asynchronous packet-switched transport over the short range radio link either sequentially or simultaneously.

Figure 4:
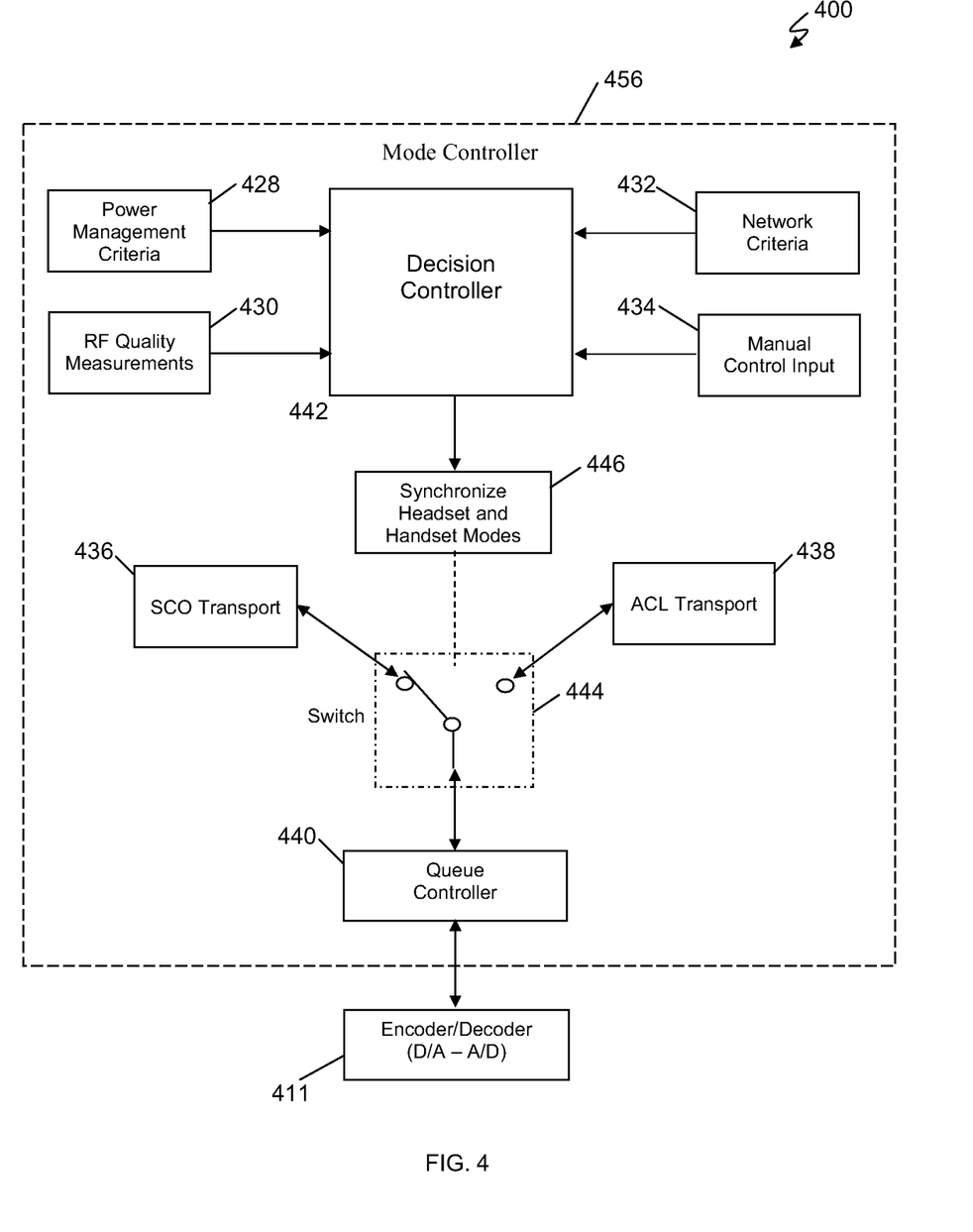
FIG. 4 is an architecture diagram including a mode controller.

FIG. 4 is an architecture diagram 400 including a mode controller 456. Mode controller may include a decision making level indicated by the decision controller 442 as illustrated in FIG. 2 as 242, a preparation level indicated by the synchronization controller 446 and an executing level indicated by the switch 444 in combination with the queue controller 440. As discussed above, the decision controller 442 may receive signals from one or more of the power management criteria input 428, the RF quality measurements input 430, the network criteria input 432, and the manual control input 434. The decision controller 442 can decide when to switch from SCO to ACL or vice-versa based on the inputs that can include the described four inputs.

The preparation level can contain a synchronization controller 446. A signal flow diagram of the synchronization controller 446 is illustrated in FIG. 3 previously discussed. The executing level can provide the switch 444 between the SCO and ACL after the time/signaling messages are exchanged between the headset 102 (see FIG. 1) and the handset 104 to synchronize the switching. The hardware and/or software switch 244 (see FIG. 2) for transport selection of one of the transports for real-time audio signal communication may be manually activated and/or automatically activated and based upon operating conditions to choose between the SCO transport 436 which may be the default transport, and the ACL transport 438. While the decision to switch is made by the decision controller 442, the operation to switch may be performed by a software and/or hardware switch 444 and a queue controller 440 at the executing level. The queue controller 440 operation may be performed between the switch 444 and the encoder/decoder 411 such as a codec (D/A-A/D).

A description of a queue controller 440 is hereby incorporated by reference to substantially simultaneously filed METHODS AND DEVICES OF A QUEUE CONTROLLER FOR DUAL MODE BIDIRECTIONAL AUDIO COMMUNICATION, on the date of 31 Oct. 2006, having received a Ser. No. 11/842,275. A patent has not yet been granted. The output of the switch 444 is processed by a queue controller 440 that can be configured to deliver at least one packet between transmission of the synchronous transport 436 and the asynchronous transport 438. That is, upon transport selection according to the selection module 126 (see FIG. 1), the switch between the synchronous circuit-switched transport and an asynchronous packet-switched transport can be processed by the queue controller 440 that can be configured to deliver at least one packet to the encoder/decoder when at least one of a wireless audio terminal and an audio gateway is in audio communication.

The described dual mode headset 102 (see FIG. 1) can have a single D/A and A/D encoder/decoder that may be a codec that can support both types of encoded packets, SCO and ACL carrying voice payload. The encoder/decoder can have two queues including a first queue 562 (see FIG. 5) for incoming packets, for example from a microphone, and including a second queue 564 for outgoing packets, for example to a speaker. The packets from SCO and ACL links can have different encoder parameters such as different packet sizes, packet types, or sampling rates. Accordingly, the mode controller 456 (see FIG. 4) can monitor the buffers when switching between the SCO and the ACL modes.

Figure 5:
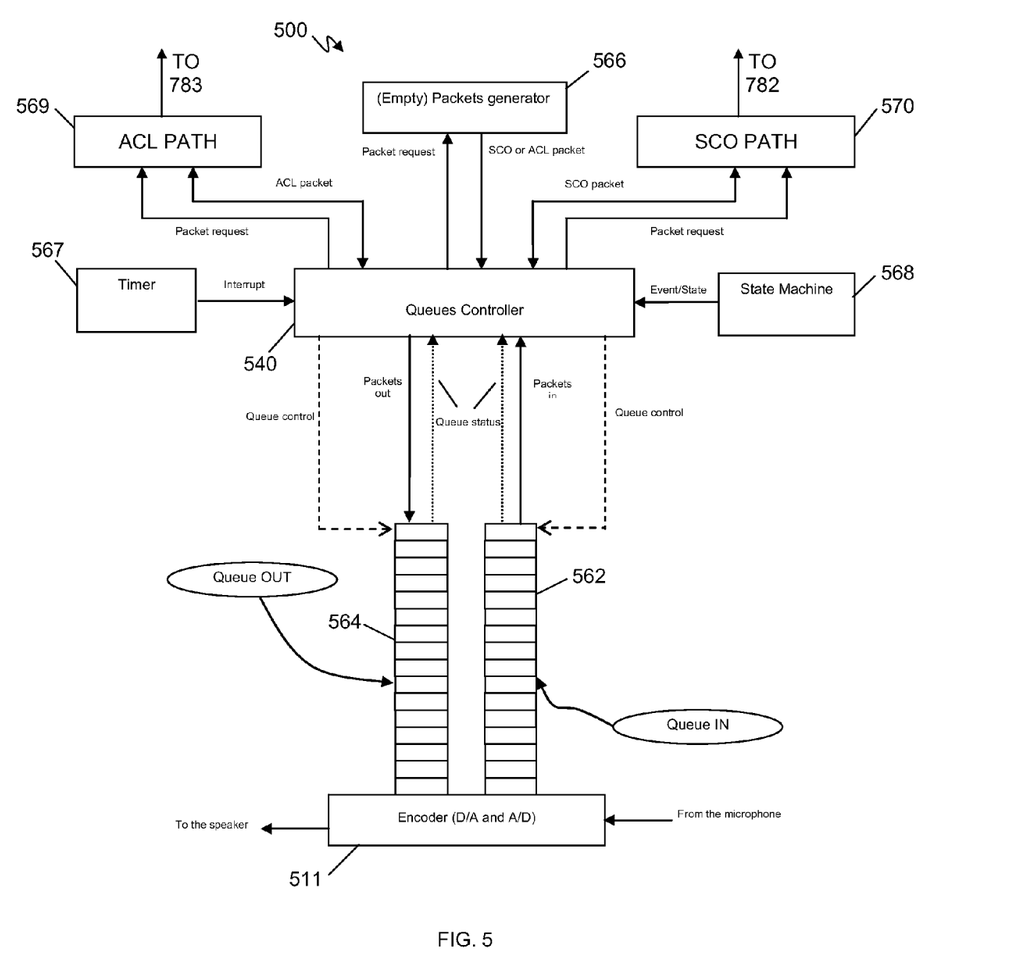
FIG. 5 illustrates some processes of a queue controller.

FIG. 5 illustrates some processes of the above-mentioned queue controller. To prevent the encoder 511 processing the outgoing queue 564 from not receiving required data and thus being rendered inoperable, the queue contents can be flushed and/or cleared when switching between modes and the packet generator 566 can pad the queue during the mode switch. That is, heterogeneity of the queue can render the encoder inoperable. For example, measures can be taken to determine, based on a first encoder parameter and a second encoder parameter, whether the queue 564 anticipates to contain heterogeneous audio packet types, that is a group of audio packets with differing encoder parameters. Heterogeneous packet types can arise from different encodings for the SCO and ACL modes such as different sampling rates and quantization. If the queue contains packets with different encoding, then the queue 564 is changed from having heterogeneous packet types to a queue having homogeneous packet types, that is a group of audio packets with identical encoder parameters. In one embodiment, the packets generator 566 can supply empty packets in case of stream interruption. In another embodiment the packets generator 566 may use a packet concealment or interpolation method to enhance the user's perceivable quality of experience. Empty packets from the empty packet generator 566 can be processed in queue 562 or queue 564.

As mentioned above, the SCO and the ACL may be processed sequentially or simultaneously. In a sequential processing the switch may be characterized as a hard handoff. In simultaneously processing, the switch may be characterized as a soft handoff. Different conditions are considered for a soft handoff or a hard handoff as is described below. Since a payload of a single input stream may be processed by the encoder/decoder 511, there may be processing overhead in terms of time taken to establish a new link when there is a change in transport. In a soft handoff, there can be a period of time where two transports are processed simultaneously. As the first transport continues through the queue controller input queue, a second transport can be buffered. Once the second is buffered, the first transport can be flushed and the second transport can populate the queue. In this way, there may be simultaneous processing of two transports. As discussed in more detail below, a "make before break" soft handoff process may involve packet concealment. On the other hand, in a hard handoff the first transport can be flushed and the second transport can be populated sequentially, but at the cost of the time taken to establish a new link when there is a change in transport. As will be discussed in more detail below, a "break before make" hard handoff process may involve empty packets and/or packet concealment.

It is understood that the queue controller 558 and handoff process are slightly different but may be considered interrelated. The queue controller 558 can prevent buffer under or over-runs for the pulse code modulated (PCM) data to and from the D/A and A/D in the cases when the encoder parameters are changed. For example, parameters can be changed when going from a case where the sampling rate is 8 KHz to one where the sampling rate is 16 KHz or even 44.1 KHz, thus changing from SCO audio to wideband ACL packetized audio or even stereo audio. The queue controller 540 may be needed in any instance where the encoder parameters changed because in that instance the 8 KHz audio packets in the buffer could not be consumed by the codec when it was operating at another sampling rate, 16 KHz, and would cause the encoder to become inoperable.

In the above-discussed case, the 8 KHz samples may be flushed and filled with packets to prevent the D/A from starving. Empty packets or some form of packet concealment may fill the packets when the encoder parameters change, for example sampling rate and packet size.

A hard handoff, or a "Break before Make" connection, can be utilized where the device 102 (see FIG. 1) terminates a SCO connection for audio and then brings up an ACL connection for audio, or vice-versa. Similarly a soft handoff or "Make before Break" connection can be utilized where the device 102 brings up an ACL channel for audio before terminating the SCO channel for audio so for a brief period of time both connections may be broadcasted simultaneously.

A soft handoff may take place without loss of information and therefore the switch can appear seamless to the user. However, a soft handoff may require more processing power and memory to maintain. Therefore the limitations on handoffs may be implementation and hardware specific, though power/battery life can be a control, specifically utilizing hard handoffs when battery power is low. Soft handoffs may not require empty packet transmissions and the hard handoff may be discernable to the user since the connection may be broken and enough information may be lost.

As mentioned, the handoffs may be related to the queue controller. Described are four scenarios in particular since the operation of the queue controller 540 and handover mechanisms may not be necessarily dependent. The queue controller 540 may be utilized when either the soft or hard handoffs change the encoder parameters. For instance when going from SCO to ACL the sampling rate could change from 8 to 16 KHz to improve speech quality or when switching from ACL to SCO the sampling rate may change from 16 KHz to 8 KHz since SCO may only support the lower audio quality.

As mentioned there are four scenarios discussed below. Hard handovers may include two scenarios, specifically, the same encoder parameters, and a change in encoder parameters. The hard handover case may require the queue controller 540 to send empty packets or conceal packet losses since the connection may be broken, information will be lost, and then a new connection will be re-established. The steps for each may be:
 1. Receive signal to change transports;
 2. Break SCO or ACL connection;
 3. Make ACL or SCO connection; and
 4. Prevent queue from starving regardless of change in codec parameters.

In the case of a soft handoff with the same codec parameters, the transmission of empty packets or concealment of packet losses may not be required since no data should be lost in such a scenario. The steps may be:
 1. Receive signal to change transports;
 2. Make additional ACL or SCO connection;
 3. Break current SCO or ACL connection; and
 4. Change inputs to D/A queue controller (Queue OUT) and similarly for A/D queue controller (Queue IN).

The case of a soft handover where the encoder parameters are changed may require the use of the Queue Controller 540 to insert new packets, not because data is lost but because of the change in sampling rates as illustrated in the previously mentioned figure. In this scenario the steps may be:
 1. Receive signal to change transports;
 2. Make additional ACL or SCO connection;
 3. Break current SCO or ACL connection; and
 4. Change inputs to D/A queue controller (Queue OUT) and add packets for transitioning of codec parameters and similarly for A/D (Queue IN) queue controller.

Still referring to FIG. 5, the timer 567 can implement synchronization between two devices as illustrated in the signal flow diagram of FIG. 3. The state machine 568 can be an event driver to control signals corresponding to a change in state or conditions as illustrated in FIGS. 2 and 4. The ACL path 569 can be the same respective paths of FIG. 7 to block 783, 785, and 786 to then be processed over the air link. The SCO path 570 can be the same respective paths of FIG. 7 to block 782 to then be processed over the air link.

Figure 6:
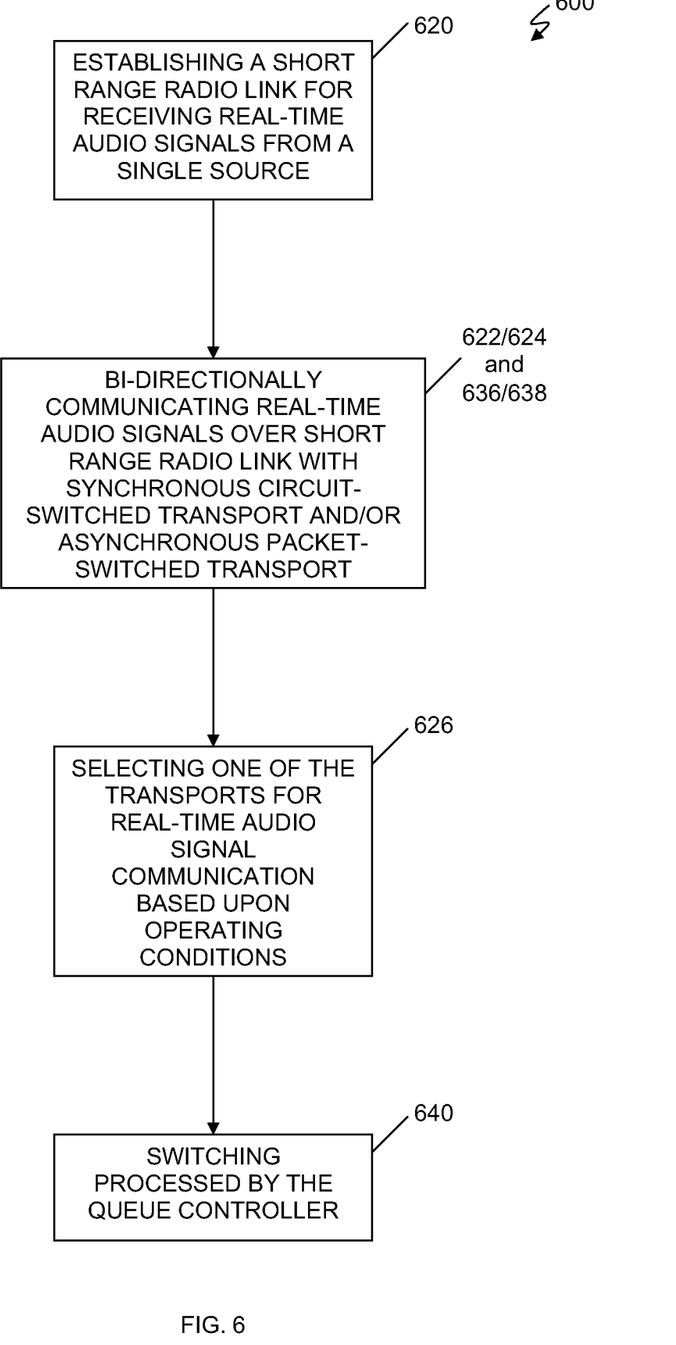
FIG. 6 is a flowchart of a method of a dual mode wireless headset according to an embodiment.

FIG. 6 is a flowchart of a method 600 of a dual mode wireless device and/or a plurality of devices of a system according to an embodiment. The steps of the flowchart are described above with respect to the FIGS. As shown in FIG. 1, a short range radio link can be established for real-time audio signals received from a single source 620 according to establishing module 120 and/or 121 (see FIG. 1). As also shown in FIG. 1, real-time audio signals can be communicated bi-directionally over a radio link using a synchronous circuit-switched transport mode (e.g., SCO) 636 and/or using an asynchronous packet-switched transport mode (e.g., ACL) 638 in accordance with synchronous connection oriented communication module 122 and/or 123 and asynchronous connectionless communication module 124 and/or 125. FIGS. 2 and 4 illustrate one of the transports is selected for real-time audio signal communication based upon operating conditions 626, as described above and according to selecting module 126 and/or 127, power management criteria module 128 and/or 129, radio frequency quality measurement module 130 and/or 131, network criteria module 132 and/or 133 and/or manual selection module 134 and/or 135. FIGS. 4 and 5 show switching between one transport and the other is processed by the queue controller 640 according to queue controller module 140 and/or 141. It is understood that fewer or more steps may be included in the above-described method.

Figure 7:
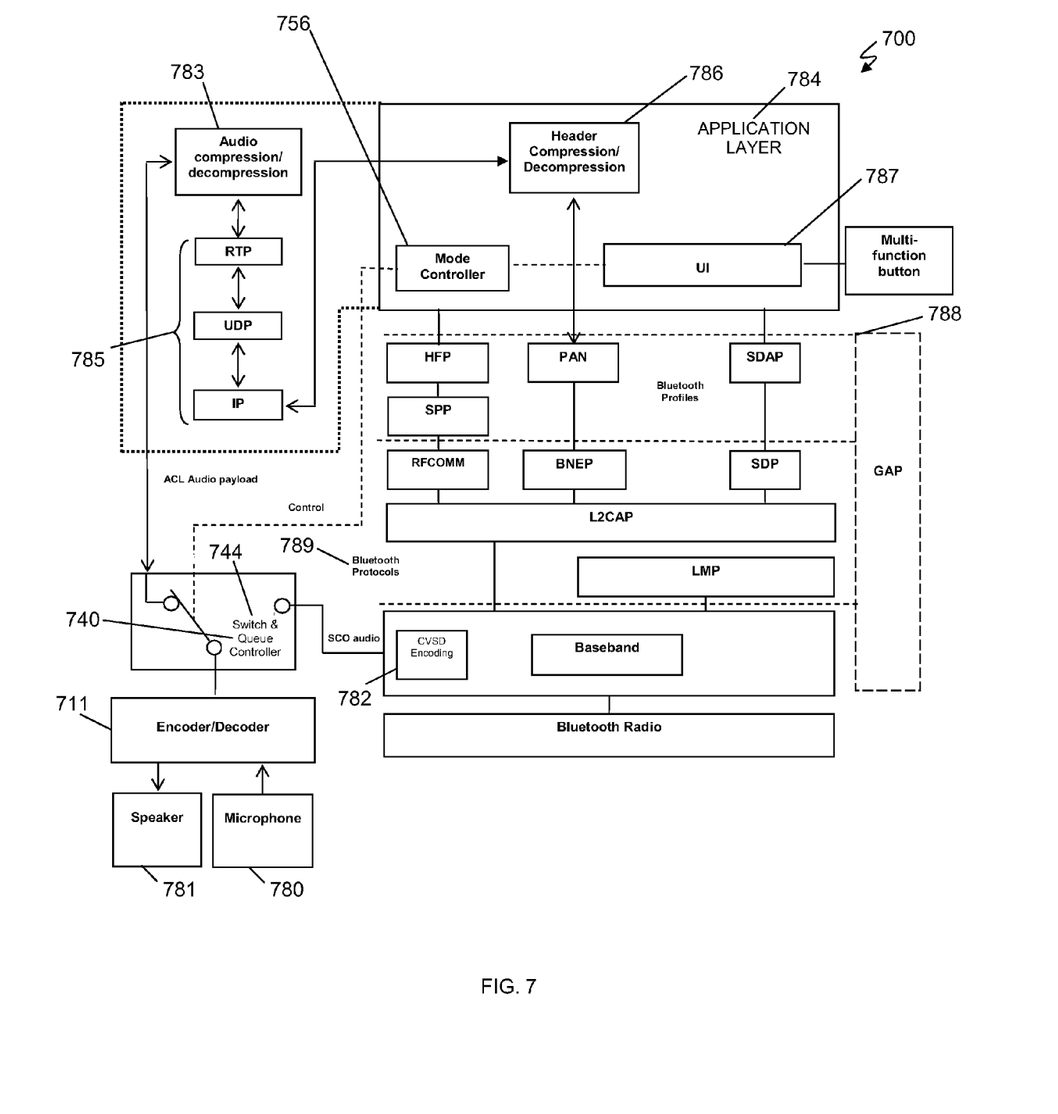
FIG. 7 depicts some architecture components of a Bluetooth® enabled I/O device such as the headset of FIG. 1.

FIG. 7 depicts some architecture components 700 of a Bluetooth® enabled I/O device such as a headset 102 (see FIG. 1). The mode controller 756, the switch 744, queue controller 740 and encoder 711 were discussed above. A microphone 780 may provide input to the encoder 711, and a speaker 781 may receive output from the decoder 711. When SCO audio transport is used, continuously variable slope delta (CVSD) encoding takes place within the hardware of the baseband processor 782.

When ACL audio transport is used, audio compression and decompression 783 takes place within an application layer 784. The ACL audio packets conform to data protocols such as a real-time transport protocol (RTP), a user datagram protocol (UDP), and an Internet Protocol (IP) 785. Packets may undergo header compression/decompression 786. A user interface 787 may be accessed using for example, a multi-function button, for manual control of switching between one transport and another.

Bluetooth® profiles 788 may use the ACL transport. Such profiles can include signaling for a handsfree profile (HFP) and data for a serial port profile (SPP), a personal area networking profile (PAN), a service discovery application profile (SDAP), and a generic access profile (GAP). Moreover, the ACL packets may further conform to protocols such as a logical link control and adaptation protocol (L2CAP), a link manager protocol (LMP), a service discovery protocol (SDP), and a Bluetooth® network encapsulation protocol (BNEP) 789. Radio frequency communication protocol (RF-COMM) provides emulation of serial ports within L2CAP.

As described in detail above, during transmission and receipt of audio signals, and in particular voice signals, a Bluetooth® device can switch between a synchronous circuit-switched transport and an asynchronous packet-switched transport, each having particular characteristics and benefits and are mutually exclusive for voice, except, for example during the switching process where they may be simultaneously transmitted. The ability to use two transports for bi directional audio signals with the ability to seamlessly handoff between the two can significantly improve the voice quality over Bluetooth® and the user's handsfree experience. In a system such as a Bluetooth® headset and a Bluetooth® enabled handset, one or the other device can make a transport selection of one of the transports for real-time audio signal communication based upon operating conditions and/or manual activation. Bluetooth® devices and particularly, headsets enjoy popularity because they provide users the ability to communicate while seamlessly operating in different environments. Accordingly, providing improved voice quality over Bluetooth® has become important for mobile device manufacturers. A headset as described above can be backwards compatible with an existing handset using the SCO transport. While a handset as described may operate better with a headset according to this disclosure. As described above, improvements made to bi-directional audio communication, and in particular voice quality over Bluetooth® may be beneficial.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. An I/O device, comprising:
a controller;
a transceiver coupled to the controller, the transceiver configured to establish a short range radio link and bi-directionally communicate real-time audio signals over a synchronous circuit-switched transport and an asynchronous packet-switched transport over the short range radio link from a single source of real-time audio signals;
a decision controller for transport selection of one of the transports during operation for real-time audio signal communication based on operating conditions; and
a switch for dynamically switching between the synchronous circuit-switched transport and the asynchronous packet-switched transport during operation for real-time audio signal communication based upon operating conditions, the switch is processed by a queue controller configured to deliver at least one packet in a queue during the switching between transmission of the synchronous transport and the asynchronous transport, wherein when the synchronous transport continues through the queue, the asynchronous transport is buffered, and once the asynchronous transport is buffered, the synchronous transport is flushed.

2. The device of claim 1 wherein the I/O device is a wireless audio terminal.

3. The device of claim 1 wherein the I/O device is an audio gateway.

4. The device of claim 1 wherein the synchronous circuit-switched transport is a Bluetooth® synchronous connection-oriented or extended synchronous connection-oriented transport.

5. The device of claim 1 wherein the asynchronous packet-switched transport is a Bluetooth® asynchronous connection-oriented transport.

6. The device of claim 1 wherein transport selection is automatically activated.

7. The device of claim 6 wherein transport selection is based on at least one of power management criteria, radio frequency quality measurements and network criteria.

8. The device of claim 1 wherein transport selection is manually activated.

9. The device of claim 1, bi-directionally communicating real-time audio signals between the wireless audio terminal and the audio gateway over a synchronous circuit-switched transport and simultaneously an asynchronous packet-switched transport of the short range radio link.

10. The device of claim 1 wherein audio signals are voice signals.

11. A method of an I/O device, comprising:
bi-directionally communicating with another I/O device over a short range radio link of real-time audio signals over a synchronous circuit-switched transport and an asynchronous packet-switched transport over the short range radio link from a single source of real-time audio signals;
providing a decision controller for transport selection of one of the transports during operation for real-time audio signal communication based on operating condition; and
dynamically switching between the synchronous circuit-switched transport and the asynchronous packet-switched transport during operation for real-time audio signal communication based upon operating conditions, the switching being processed by a queue controller configured to deliver at least one packet in a queue during the switching between transmission of the synchronous transport and the asynchronous transport, wherein when the synchronous transport continues through the queue, the asynchronous transport is buffered, and once the asynchronous transport is buffered, the synchronous transport is flushed.

12. The method of claim 11, bi-directionally communicating real-time audio signals between the wireless audio terminal and the audio gateway over a synchronous circuit-switched transport and simultaneously an asynchronous packet-switched transport of the short range radio link.

13. The method of claim 11 wherein the synchronous circuit-switched transport is a Bluetooth® synchronous connection-oriented or extended synchronous connection-oriented transport.

14. The method of claim 11 wherein the asynchronous packet-switched transport is a Bluetooth® asynchronous connection-oriented transport.

15. The method of claim 11 wherein transport selection is automatically activated.

16. The method of claim 15 wherein the transport selection is based on at least one of power management criteria, radio frequency quality measurements and network criteria.

17. The method of claim 11 wherein transport selection is manually activated.

18. The method of claim 11, further comprising: switching processed by a queue controller configured to deliver at least one packet in a queue when the wireless audio terminal is switching audio communication between the synchronous transport and the asynchronous transport.

19. The method of claim 11 wherein audio signals are voice signals.

20. A method of a dual mode wireless headset system, including a wireless audio terminal and an audio gateway, the method comprising:
establishing a short range radio link between the wireless audio terminal and the audio gateway;
bi-directionally communicating real-time audio signals between the wireless audio terminal and the audio gateway over a synchronous circuit-switched transport and an asynchronous packet-switched transport of the short range radio link from at least one single source;
providing a decision controller for transport selection of one of the transports during operation for real-time audio signal communication based on operating condition; and
dynamically switching between the synchronous circuit-switched transport and the asynchronous packet-switched transport during operation for real-time audio signal communication based operating conditions of at least one of the wireless audio terminal and the audio gateway, the switching being processed by a queue controller configured to deliver at least one packet in a queue during the switching between transmission of the synchronous transport and the asynchronous transport, wherein when the synchronous transport continues through the queue, the asynchronous transport is buffered, and once the asynchronous transport is buffered, the synchronous transport is flushed.

21. The method of claim 20 wherein the synchronous circuit-switched transport is a Bluetooth® synchronous connection-oriented or extended synchronous connection-oriented transport.

22. The method of claim 20 wherein the asynchronous packet-switched transport is a Bluetooth® asynchronous connection-oriented transport.

23. The method of claim 20 wherein transport selection is automatically activated.

24. The method of claim 20 wherein transport selection is based on at least one of radio frequency quality measurements, network criteria and power management criteria.

25. The method of claim 20 wherein transport selection is manually activated.

26. The method of claim 20, further comprising: switching processed by a queue controller configured to deliver at least one packet in a queue when the wireless audio terminal is switching audio communication between the synchronous transport and the asynchronous transport.

27. The method of claim 20, upon transport selection, further comprising: switching between the synchronous circuit-switched transport and an asynchronous packet-switched transport that is processed by a queue controller configured to deliver at least one packet in a queue when at least one of the wireless audio terminal and the audio gateway is in audio communication.

28. The method of claim 20 wherein audio signals are voice signals.

* * * * *